(12) United States Patent
Pelcarsky et al.

(10) Patent No.: US 7,316,759 B2
(45) Date of Patent: Jan. 8, 2008

(54) HAND APPLICATION TOOL FOR LAYING SEALANT SPACER STRIP ON GLASS OR LIKE MATERIAL

(75) Inventors: Tom Pelcarsky, Solon, OH (US); Wayne Pelcarsky, Walton Hills, OH (US); Jason Ackerman, Aurora, OH (US)

(73) Assignee: AGC Flat Glass North America, Inc., Alpharetta, GA (US)

( * ) Notice: Subject to any disclaimer, the term of this patent is extended or adjusted under 35 U.S.C. 154(b) by 385 days.

(21) Appl. No.: 10/858,385

(22) Filed: Jun. 2, 2004

(65) Prior Publication Data
US 2005/0000660 A1 Jan. 6, 2005

Related U.S. Application Data

(63) Continuation of application No. 10/280,469, filed on Oct. 25, 2002, now Pat. No. 6,761,201.

(51) Int. Cl.
B32B 38/04 (2006.01)
(52) U.S. Cl. .................. 156/257; 156/64; 156/109; 156/250

(58) Field of Classification Search ................ 156/378, 156/468, 486, 523, 530, 574, 576, 577, 579, 156/64, 109, 106, 107
See application file for complete search history.

(56) References Cited

U.S. PATENT DOCUMENTS

| 5,013,377 | A | 5/1991 | Lafond |
| 5,045,146 | A | 9/1991 | Rundo et al. |
| RE35,291 | E | 7/1996 | Lafond |
| 5,975,181 | A | 11/1999 | Lafond |
| 6,030,475 | A | 2/2000 | Spotts, Jr. |
| 6,138,735 | A | 10/2000 | Field et al. |
| 6,394,164 | B1 | 5/2002 | Lafond |

FOREIGN PATENT DOCUMENTS

AT 393 828 B 12/1991

Primary Examiner—Melvin Mayes
(74) Attorney, Agent, or Firm—Rothwell, Figg, Ernst & Manbeck

(57) ABSTRACT

An hand application tool for laying a sealant spacer strip along a glass sheet for forming insulating glass units having a handle with first and second ends; a base having freely rotatable rollers connected to the first end of the handle; and a housing connected to the first end of said handle and to the base the housing having a positioning roller, at least one guide pin and a housing roller wherein the at least one guide pin and the housing roller form a guideway for deploying the adhesive strip and the housing roller provides pressure for applying the sealant spacer strip onto the glass sheet.

8 Claims, 4 Drawing Sheets

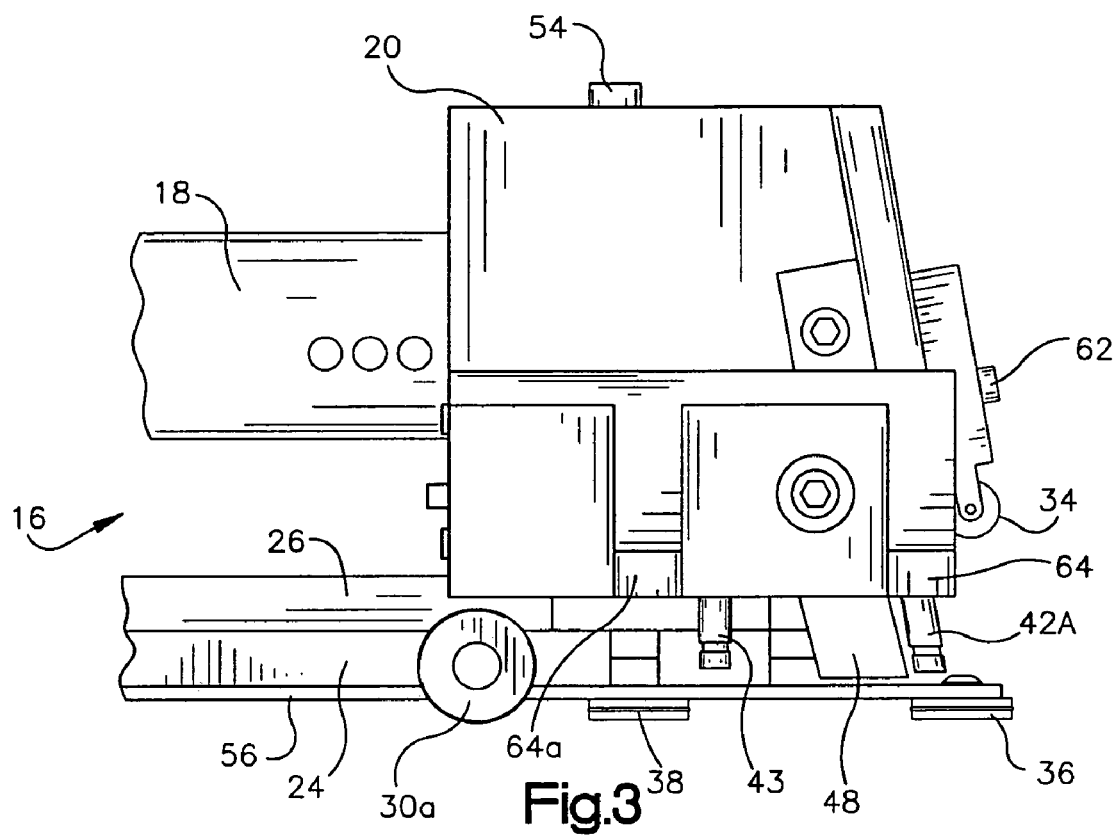
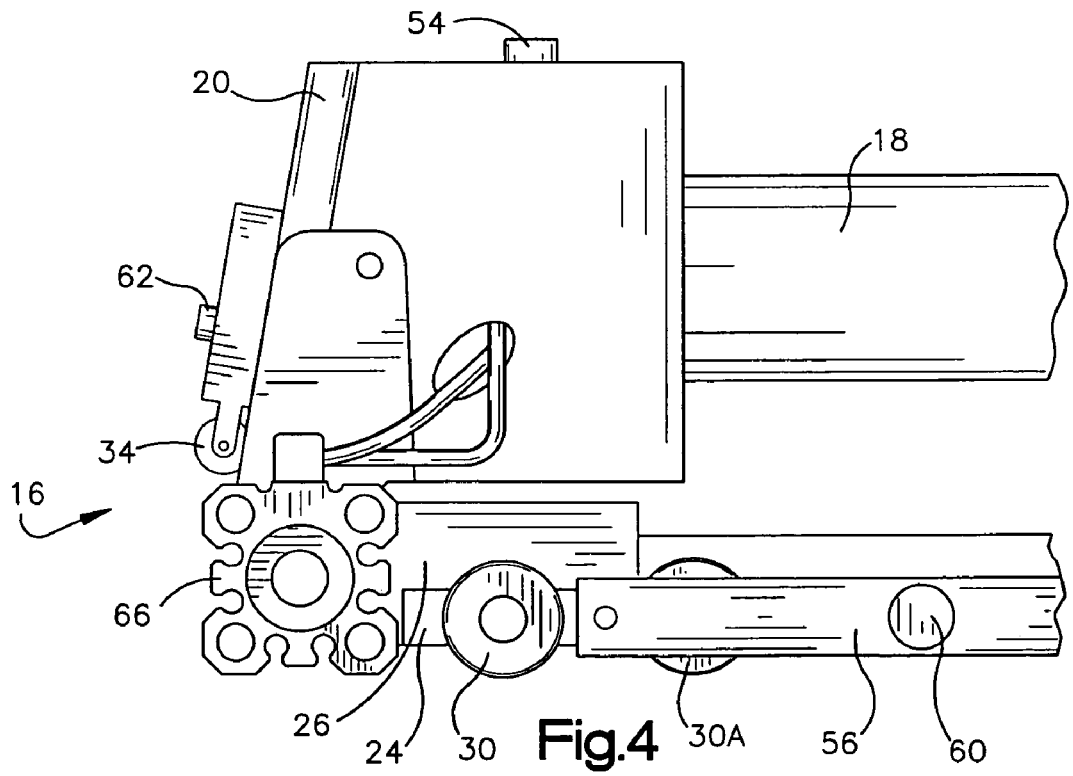

though, that this detailed description, while indicating pre-
HAND APPLICATION TOOL FOR LAYING SEALANT SPACER STRIP ON GLASS OR LIKE MATERIAL

RELATED APPLICATION DATA

This application is a continuation of U.S. patent application Ser. No. 10/280,469 filed on Oct. 25, 2002, now U.S. Patent No. 6,761,201, the entire contents of which are hereby incorporated by reference.

FIELD OF THE INVENTION

The present invention relates to an apparatus for laying an adhesive strip such as a sealant spacer strip along the peripheral edges of a glass sheet where positioning such a strip is one step in the assembly of an insulating glass unit.

BACKGROUND OF THE INVENTION

In general, the procedure for assembling an insulating window structure involves placing one sheet of a glazed structure, such as glass, over another in a fixed, spaced relationship, with a spacing and sealing means located at and along the periphery of the two structures, thereby forming a sandwich-type structure having a sealed air space between the structures. The sealed air space provides improved insulation capabilities. Difficulties exist, however, in the manufacture of the windows, especially the deployment and positioning of the sealant spacer strip.

To keep the glazed structures properly spaced apart, a rigid spacer strip is formed into a frame and placed between the two structures to maintain proper spacing after which the sealant composition is injected into a channel formed by this spacer frame and the edges of the glazed structures. Alternatively, the rigid spacer can be pre-coated with sealant and placed into the space between the glazed structures to form the insulating window structure.

Sealant spacer strips can be continuous whereby a single strip runs without interruption along the entire periphery of the glass sheet and has the flexibility to be bent into corners. When using flexible spacers, the degree of flexibility should be sufficient to permit a spacer to be bent around a corner. If it is not flexible enough, the spacer must be cut or notched to facilitate this bending. The manual application of a continuous strip, however, can require considerable ability on the part of the installer, especially to form consistent corners and if corners require notching, to properly place the notch. Also, continuous spacer strips may need to be removed and re-positioned, if the spacer strip is placed in incorrectly on the glass sheet.

One conventional method of assembling or making an insulating window unit consists of starting at one corner applying an adhesive strip, typically a sealant spacer strip, along a peripheral edge of a glazed structure, forming corners where required, cutting the strip to length after formation of the last corner and then positioning a second glazed structure thereon to form a panel with an sealant spacer strip holding the glazed structures apart from each other.

Applying the sealant spacer strip by hand can be time consuming and result in poor or inconsistent positioning of the sealant spacer strip. Also, the manufacturer must apply pressure by hand to get the sealant spacer strip to adhere to the glass sheet. The inconsistency of this pressure results in inconsistent adherence of the sealant spacer strip to the glass sheet.

In order to alleviate some of these problems, application tools have been used to lay down sealant spacer strips on glass sheets. These tools require that the sealant spacer strip be threaded through the tool and must remain threaded in the tool until a complete assembly is fabricated. Many application tools make it difficult to reposition a mis-deployed threaded strip, because the device cannot be easily disengaged from the sealant spacer strip and re-deployed in the middle of fabricating an insulating glass unit. Instead the tool must be run back over the strip to the place of mis-deployment and then the strip re-positioned. This is often not possible forcing the window manufacturer to scrap the mis-deployed strip. Also, many of the tools do not provide capabilities for determining where the sealant spacer strip should be notched for cornering.

SUMMARY OF THE INVENTION

It is an object of the present invention to provide a tool that easily applies the sealant spacer strip along the peripheral edges of a glass sheet.

In one embodiment of the present invention, there is provided a hand application tool for applying a strip of material to a surface of a glass sheet or other member adjacent to the periphery thereof wherein the strip of material may be re-positioned if necessary.

In yet another embodiment of the present invention, a hand application tool is provided having a guideway formed by a series of pins and rollers to enable the enable the precise deployment along the glass sheet periphery, formation of corners in the sealant spacer strip, provide consistent down-pressure for contacting the strip on the glass sheet and providing a means for easier for re-positioning of sealant spacer strip improperly deployed on the glass sheet.

It is yet another object of the present invention to provide a guide plate and associated guide rollers for varying the distance between the edges of the glass members and the sealant/spacer strip.

It is a further object of the present invention to provide an adjustable down pressure roller and an adjustable front positioning roller to accommodate varying thicknesses or gauges of sealant spacer strip.

In another embodiment, a targeting system is provided which is capable of projecting an indicator light to aid the user in determining where the sealant spacer strip should be turned to form a corner and/or notched for cornering.

In yet another embodiment, a cutting mechanism is provided for notching or cutting the sealant spacer strip in order to form corners.

Other objects and the further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 3 is a side view of the front portion of the embodiment of FIG. 1;

FIG. 4 is another side view of the front portion of the embodiment of FIG. 1;

DETAILED DESCRIPTION

Figure 1:
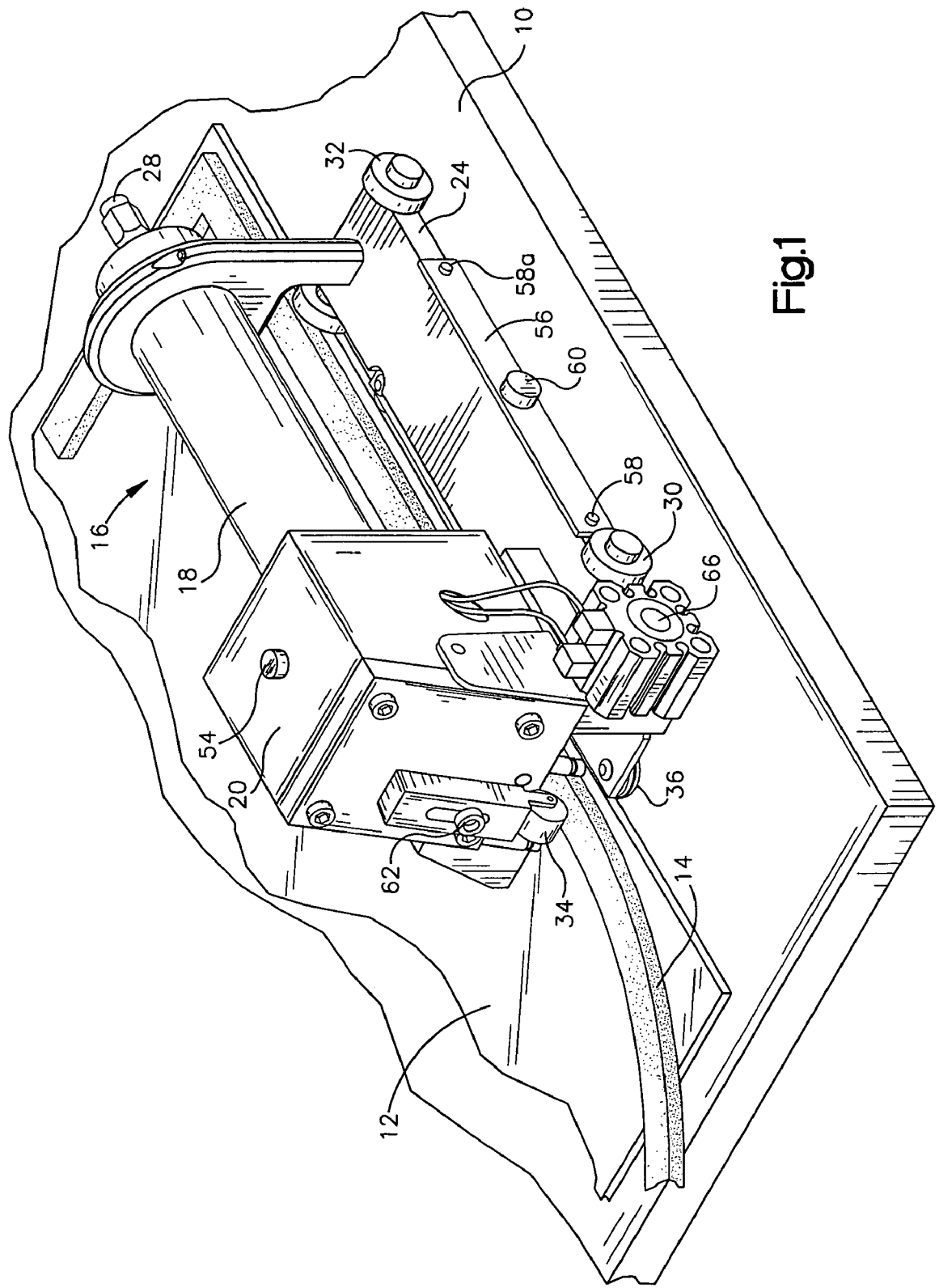
FIG. 1 is side elevational view showing an embodiment of the present invention during the application of a strip on a glass sheet positioned on a work table.

Referring now to the drawings, as seen in FIG. 1, there is shown a work table 10 having a glass sheet 12 placed on it so that an sealant spacer strip 14 may be laid along the peripheral edge of the glass sheet 12 by a hand application tool 16 of the present invention. A second glass sheet is then subsequently placed on the top surface of the sealant spacer strip 14 to form an insulating glass unit ("IGU").

The hand application tool 16 of the present invention, generally denoted as 16, has a handle 18 connected at one end to a housing 20 and at an opposing end to a handle support 22. The handle support 22 is in turn connected to a base plate 24. As can be best seen in FIGS. 2, 3 and 4, at the end of the base plate 24, opposite the handle support 22, the base plate has a base plate bracket 26.

The base plate bracket 26 may be affixed to the base plate 24 as a separate component or may be integral with it. The base plate bracket 26, as illustrated, generally has a lower portion connected to the base plate 24 and a top portion affixed to and supporting the housing 20. In this manner, these components form a frame for the hand application tool 16.

At end of the handle 18 opposite the housing 20 is an air inlet nozzle 28 capable of being connected to a source of forced air such as an air hose for activating a cutting mechanism. Of course, one of skill in the art will readily appreciate that any number of other electro-mechanical mechanisms may be used to drive the cutting mechanism. Also, not illustrated, but located in the vicinity of the air inlet nozzle 28 is a power coupling so that a power supply may be connected to the hand application tool 16.

The hand application tool 16 has a series of rollers, guides and pins for deploying and positioning sealant spacer strip 14 onto glass sheets 12. As can be seen in FIG. 3, a front roller 30 is mounted on an axle of the base plate 24 so that the front roller 30 is freely rotatable about the axle. As can be seen in FIGS. 1 and 4, on the opposing side of the base plate 24 is located a second, corresponding front roller 30a. Front roller 30a, like its counterpart, is mounted on an axle located on the base plate 24 and is likewise freely rotatable about its respective axle. As can also be best seen in FIG. 1, a set of rear rollers 32, 32a is also provided. These rollers are also mounted on an axle attached to the base plate 24.

Figure 2:
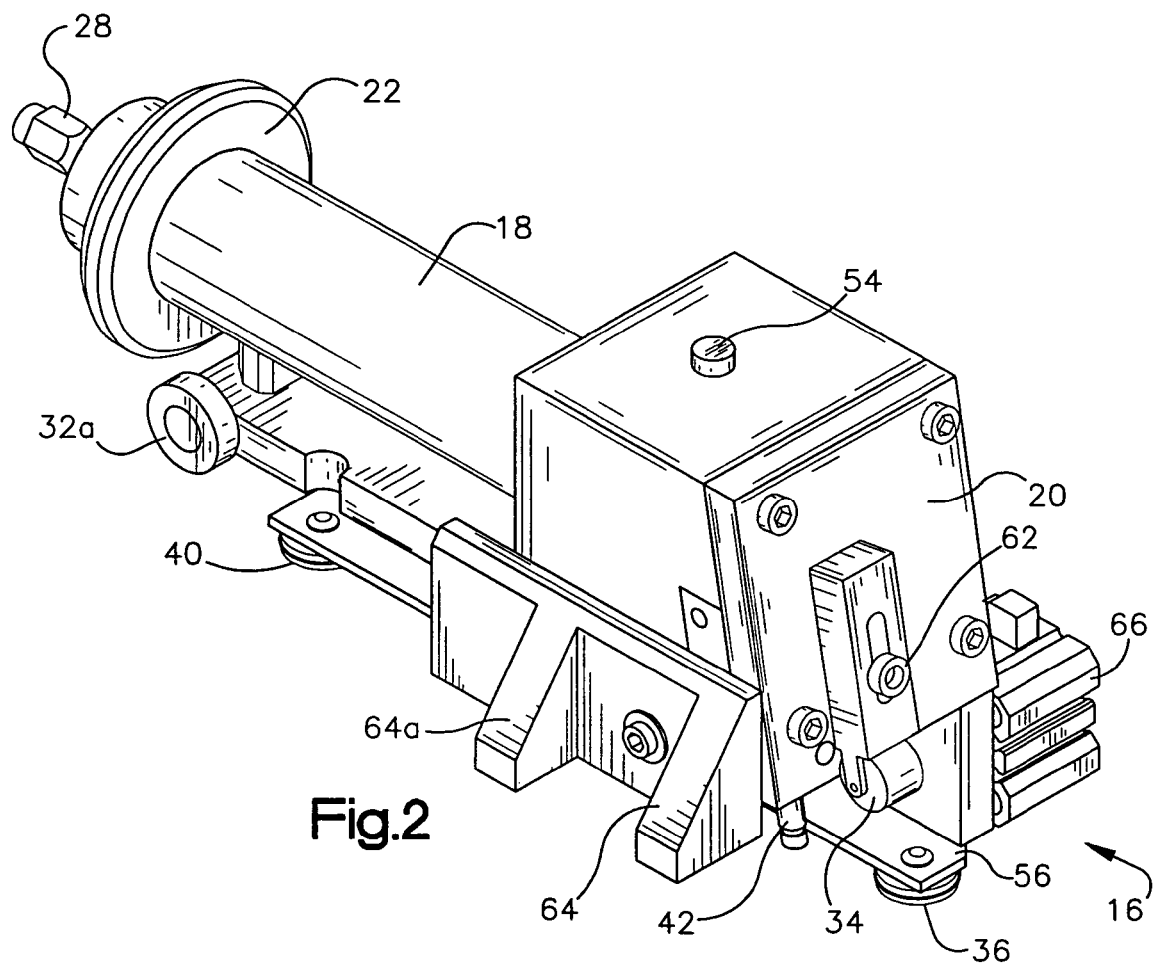
FIG. 2 is a top perspective view of the embodiment of FIG. 1.

In one embodiment of the present invention, the hand application tool 16 also has a series of guide rollers 36, 38 and 40 oriented horizontally to the guide plate 56. As seen in FIGS. 1 and 2, a front guide roller is attached to the front of the guide plate 56, and the front guide roller 36 may freely rotate about an axle. As illustrated, the front guide roller 36 is oriented horizontally relative to the base plate. In other words, the front guide roller 36 rotates in the plane perpendicular to the plane of rotation of the front and rear rollers 30, 30a and 32, 32a. Besides the front guide roller 36, a middle guide roller 38 and a rear guide roller 40 may be provided. At least two guide rollers are used for ensuring proper contact and spacing between the hand application tool 16 and the edge of the glass sheet 12. The middle guide roller 38 can be best seen in FIGS. 5 and 6. The rear guide roller 40 can be seen in FIG. 2 and is located towards the back edge of the guide plate 56, which in turn is attached to the base plate 24. These rollers determine the position of the tool relative to the glass sheets.

Figure 5:
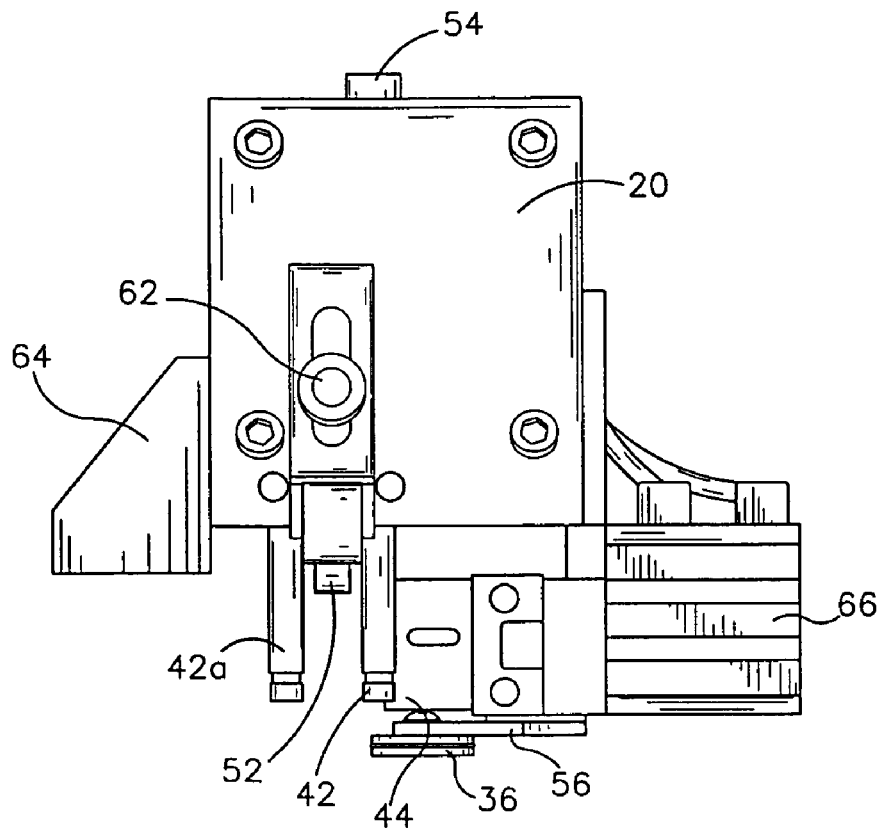
FIG. 5 is a front view of the housing of the embodiment of FIG. 1.
Figure 6:
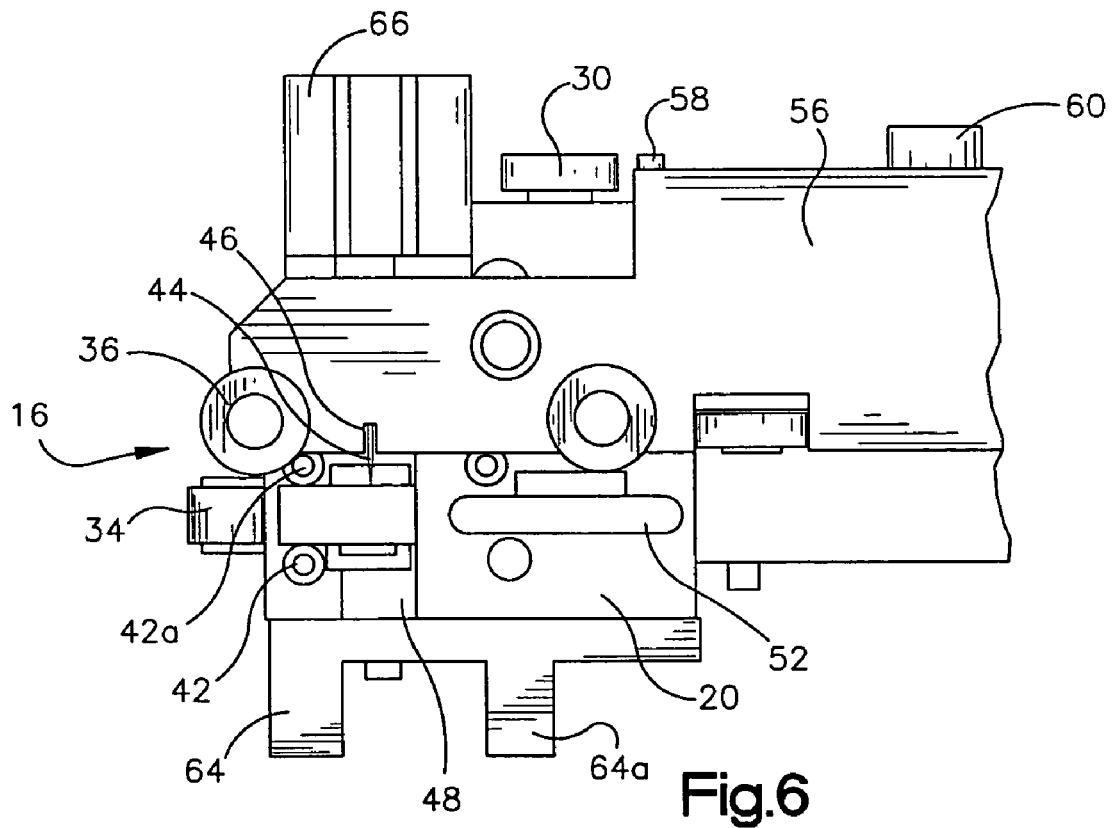
FIG. 6 is a view of the underside of the housing of the embodiment of FIG. 1.

As illustrated in FIGS. 5 and 6, the hand application tool 16 can also include a series of positioning pins 42, 42a, and 43 attached to the housing and extending downward so that the pins are oriented generally vertically. In one embodiment, the pins 42, 42a and 43 are attached to the housing and can freely rotate. Additionally, the pins can be encased with a sleeve of polymeric material of varying thickness for accommodating sealant spacer strips of differing thickness. Thus, the pins 42, 42a and 43, the down-pressure roller 52 and front positioning roller 34 form a guideway for the accurate and consistent deployment of the sealant spacer strip 14. The guideway enables the user to turn the hand application tool 16 when deploying sealant spacer strip for the easy formation of corners within the strip. It also allows the user to remove the hand application tool 16 from the sealant spacer strip and re-position sealant spacer strip as necessary, which is particularly advantageous when the user is only partially finished deploying the strip. Conversely, the hand application tool 16 can be easily re-positioned on a sealant spacer strip already adhered to the glass sheet 12 to finish deploying the strip and forming the insulating glass unit.

As can also be seen in FIG. 5 is the cutting mechanism of an embodiment of the present invention. In one embodiment, the cutting mechanism comprises a blade 44 capable of back and forth movement generally parallel to the glass sheet 12 within a slot or blade guide 46 and contacting with an anvil 48. The cutting mechanism can be activated by a blade activation knob or button 50 powered by the air supply or any other known means for reciprocating a blade. The cutting mechanism may also have different cut depth activation buttons. In this embodiment, for instance, by activating the first activation button, the sealant spacer strip 14 is notched so that it can be bent to form a corner. It is notched by partially cutting into the sealant spacer strip 14. In this case, the cutting blade 44 stops short of the anvil. If the second activation button is activated, the cutting blade 44 extends further to totally cut off the sealant spacer strip 14. This cut is performed at the final corner of the insulating glass unit to complete deployment of the sealant spacer strip 14.

To further aid in the deployment of the sealant spacer strip 14, in one embodiment the hand application tool may also include a down-pressure roller 52 for placing pressure on the sealant spacer strip 14 during dispensing. As can be seen in FIGS. 3 and 5, the down-pressure roller 52 rotates on an axle partially contained within a slot in the underside of the housing. The down-pressure roller 52 forms part of the previously described guideway. The adjustable axle or shaft is ultimately connected to a down-pressure roller adjustment knob 54. By turning the down-pressure roller adjustment knob, the down-pressure roller 52 may be moved up or down within the down-pressure roller channel 52. The down-pressure roller is spring loaded so small variations in sealant spacer strip height can be maintained while keeping the downward pressure on the sealant spacer strip generally uniform. In operation, the down-pressure roller exerts pressure on the sealant spacer strip 14 to adhere it to the glass sheet 12.

To further aid in the positioning and deployment of the sealant spacer strip, the hand application tool may also include an adjustable guide plate 56 to provide a means for laying the sealant spacer strip a proper distance from the edge of the glass sheet. By maintaining contact between the edge of the guide rollers 36, 38 and 40 of the guide plate 56 and the glass sheet 12, the user is able to control the proper spacing of the sealant spacer strip from the edge or periphery of the glass sheet.

In order to adjust the guide rollers 36, 38, and 40, the guide plate attachment screws 58, 58a are loosened. Then the guide plate adjustment knob 60 is turned to move the guide plate back and forth across the bottom surface of the base plate until the guide rollers 36, 38 and 40 contact the glass sheet 12 at the desired distance so that the sealant spacer strip is applied at the desired location on the glass sheet 12. Once the desired position is attained, the screws 58, 58a are tightened to fix the guide plate 56 in place and deployment of the sealant spacer strip may proceed.

Attached to the front of the housing is a front positioning roller 34. In one embodiment, as illustrated in FIGS. 1 and 2, the front positioning roller 34 can be attached to the housing via an adjustable attachment 62 such as a screw or bolt in a slot. If the screw or bolt is loosened, the front positioning roller 34 can be slidably moved within a slot or groove in the attachment 62. Once the desired height for the front positioning roller 34 is found, the screw or bolt can be tightened to frictionally engage the outer surface of the attachment. Of course, one of skill in the art will readily appreciate that other types of attachments that allow adjustment of the height of the front positioning roller may be used.

The hand application tool 16 of the present invention may also have a targeting system to alert the user where the sealant spacer strip 14 must be notched and where to form corners. The targeting system may comprise a set of laser ports 64, 64a powered by a laser or lasers 66. As can be further seen, the laser 66 is activated by a laser control switch (not shown). By activating the control switch, the laser 66 is turned on and light indicator beams are sent out their respective laser ports 64, 64a to project an indicating spot at some distance from the hand application tool 16 that is easily seen by the operator. Besides lasers, any other known optical beam may be used for this purpose.

In operation, the sealant spacer strip 14 is applied to the top face of the glass sheet 12 by inserting the strip 14 underneath the front positioning roller 34 and between the positioning pins 42, 42a and 43 to contact the down-pressure roller 52. The user then rolls the hand toll along the work table supported by the front and back rollers 30, 30a and 32, 32a with the guide rollers 36, 38, and 40 engaging the side of the glass sheet. The user holds the sealant spacer strip 14 to be deployed above and in front of the tool 16 so that the top surface of the sealant spacer strip 14 engages the front positioning roller 34. As the sealant spacer strip 14 is deployed, it is guided by the positioning pins 42, 42a and 43 laterally and front positioning roller 34 vertically, moves through the guideway and vertically engages the down-pressure roller 52, which serves to apply a pressure on the sealant spacer strip 14 to secure it to the glass sheet 12.

The targeting system allows the user to watch the indicator lights projected from the laser ports 64, 64a to determine when the hand application tool 16 has reached a corner and the sealant spacer strip 14 needs to be notched and then where the hand application tool 16 needs be turned or pivoted. In other words, the first laser port 64 projects an indicator light beam that is easily viewable by the user to show the user where the sealant spacer strip 14 should be notched. The user aligns the first indicator light with the edge of the glass sheet 12, provided the angle of the corner is ninety degrees, and then activates the cutting blade activation button 50 to notch the sealant spacer strip 14. The user then moves the hand application tool 16 along the sealant spacer strip 14 until the second indicator light beam from the second laser port 64a aligns with the edge of the glass sheet 12. At this point, the centerline of the down-pressure roller 52 will be immediately above the notch. The user pivots the hand application tool 16 about this the centerline of down-pressure roller 52 to form a corner in the sealant spacer strip 14. The process is then repeated for the next side of the glass sheet.

While in accordance with the patent statutes, the best mode and preferred embodiment has been set forth, the scope of the invention is not limited thereto, but rather by the scope of the attached claims. Although the invention has been described above in relation to specific forms, it should be evident to the persons skilled in the art that it may be modified and defined in various ways and should not be limited in interpretation, except by the terms of the following claims.

We claim:

1. A method for assembling an insulated glass assembly, comprising steps of:
    using a hand tool for applying a spacer strip along a glass sheet, said hand tool including a housing having a base plate and a guideway to deploy a spacer strip onto the glass sheet, an adjustable guide plate having rollers and being coupled with the base plate for increasing or decreasing a distance from an edge of said glass sheet to said guideway, and a cutting mechanism to notch said spacer strip, applying said spacer strip to a first edge of a top face of said glass sheet;
    setting a distance from the edge of the glass sheet at which said spacer strip will be deployed;
    notching said spacer strip with said hand tool when said spacer strip reaches a first corner of said glass sheet;
    applying said spacer strip to a second edge of said glass sheet;
    notching said spacer strip with said hand tool when said spacer strip reaches a second corner of said glass sheet;
    applying said spacer strip to a third edge of said glass sheet;
    notching said spacer strip with said hand tool when said spacer strip reaches a third corner of said glass sheet;
    applying said spacer strip to a forth edge of said glass sheet; and
    cutting said spacer strip.

2. The method of claim 1 wherein said hand tool further comprises a targeting system located inside or attached thereto, capable of projecting a light indicator, said method further comprising a step of:
    identifying when said spacer strip reaches said first corner of said glass sheet from said light indicator.

3. The method of claim 1 wherein said hand tool further comprises a targeting system located inside or attached thereto, capable of projecting first and second light indicators, and said method further comprising steps of:
    identifying when said spacer strip reaches said first corner of said glass sheet from said first light indicator;
    after notching said spacer strip, identifying a pivoting position at which to pivot said spacer strip about said first corner; and
    pivoting said spacer strip about said first corner before applying said spacer strip to said second edge.

4. The method of claim 3 wherein the identifying the corner, identifying the pivoting position and pivoting steps are also performed at a said second or third corners of said glass sheet.

5. The method of claim 4 wherein said identifying the corner step includes aligning said first light indicator with an edge of said glass sheet.

6. The method of claim 4 wherein identifying a pivoting position at which to pivot said spacer strip about said first corner includes aligning said second light indicator with an edge of said glass sheet.

7. The method of claim 1 wherein said hand tool further comprises guide rollers for engaging with said glass sheet and for engaging with a work table, and said method further comprises placing said glass sheet onto the work table and engaging said hand tool with said glass sheet and said work table.

8. A method for assembling an insulated glass assembly, comprising steps of:

using a hand tool for applying a spacer strip along a glass sheet, said hand tool including means for deploying a spacer strip onto the glass sheet, adjustable guide means for increasing or decreasing a distance from an edge of said glass sheet and said means for deploying a spacer strip, notching means for notching said spacer strip and a targeting system located inside or attached thereto, capable of projecting first and second light indicators, applying said spacer strip to a first edge of a top face of said glass sheet;

notching said spacer strip with said hand tool when said spacer strip reaches a first corner of said glass sheet;

applying said spacer strip to a second edge of said glass sheet;

notching said spacer strip with said hand tool when said spacer strip reaches a second corner of said glass sheet;

applying said spacer strip to a third edge of said glass sheet;

notching said spacer strip with said hand tool when said spacer strip reaches a third corner of said glass sheet;

applying said spacer strip to a forth edge of said glass sheet; and cutting said spacer strip:

said method further comprising steps of:

identifying when mid spacer flip reaches said first corner of said glass sheet from said first light indicator;

after notching said spacer strip, identifying a pivoting position at which to pivot said spacer strip about said first corner; and pivoting said spacer strip about said first corner before applying said spacer strip to said second edge;

wherein the identifying the corner, identifying the pivoting position and pivoting steps are performed at a plurality of corners of said glass sheet;

wherein said identifying the corner step includes aligning said first light indicator with an edge of said glass sheet; and wherein identifying a pivoting position at which to pivot said spacer strip about said first corner includes aligning said second light indicator with an edge of said glass sheet.

* * * * *